United States Patent [19]

Smoot

[11] Patent Number: 5,575,595
[45] Date of Patent: Nov. 19, 1996

[54] LOW PROFILE PARALLEL RAILCAR DISCHARGE ADAPTOR

[75] Inventor: David K. Smoot, Overland Park, Kans.

[73] Assignee: Smoot Co., Kansas City, Kans.

[21] Appl. No.: 296,223

[22] Filed: Aug. 25, 1994

Related U.S. Application Data

[63] Continuation-in-part of Ser. No. 40,890, Mar. 31, 1993, Pat. No. 5,387,058.

[51] Int. Cl.⁶ .................................................. B65G 53/08
[52] U.S. Cl. ........................... 406/39; 406/145; 406/185; 406/118
[58] Field of Search .................................. 406/145, 185, 406/39, 38, 44, 169, 118, 117, 120

[56] References Cited

U.S. PATENT DOCUMENTS

| | | |
|---|---|---|
| 1,257,704 | 2/1918 | Haupt . |
| 2,418,302 | 4/1947 | Hornbrook . |
| 2,813,640 | 11/1957 | Loomis . |
| 3,014,485 | 12/1961 | Karlsson . |
| 3,123,406 | 3/1964 | Pfening .................................. 406/39 |
| 3,627,157 | 12/1971 | Blatchly . |
| 3,635,492 | 1/1972 | Maudlin . |
| 4,033,422 | 7/1977 | Benning . |
| 4,655,269 | 4/1987 | Hanser et al. . |
| 4,902,173 | 2/1990 | Hendee et al. . |
| 4,993,883 | 2/1991 | Jones .................................. 406/39 |
| 5,125,771 | 6/1992 | Herman et al. . |
| 5,167,471 | 12/1992 | Kice et al. . |

FOREIGN PATENT DOCUMENTS

| | | |
|---|---|---|
| 1075441 | 2/1961 | Germany . |
| 189039 | 1/1922 | United Kingdom . |

*Primary Examiner*—David M. Mitchell
*Attorney, Agent, or Firm*—Litman, McMahon and Brown, L.L.C.

[57] ABSTRACT

A low profile parallel railcar discharge adaptor is designed for connection between a discharge gate of a center discharge railroad hopper car and a pneumatic conveyor for unloading pulverulent and granular material, such as sugar and the like, from the car. The adaptor includes low profile, parallel double airlocks in a single housing mounted on a frame with an attached pair of main wheels, each of which is attached to a hydraulic jack. The frame includes members which perform the dual function of support and air passage, thus helping to minimize the profile height of the adaptor. A handle is connected to the adaptor frame, extending therefrom upward at an angle and terminating in a comfortable operating position. A pair of drive motors and a corresponding pair of gear housings are attached to the handle, with each drive motor and gear driving a respective one of the rotary airlocks via an angled universal joint. A control for the hydraulic jacks is located on the handle proximate a handle grip.

17 Claims, 3 Drawing Sheets

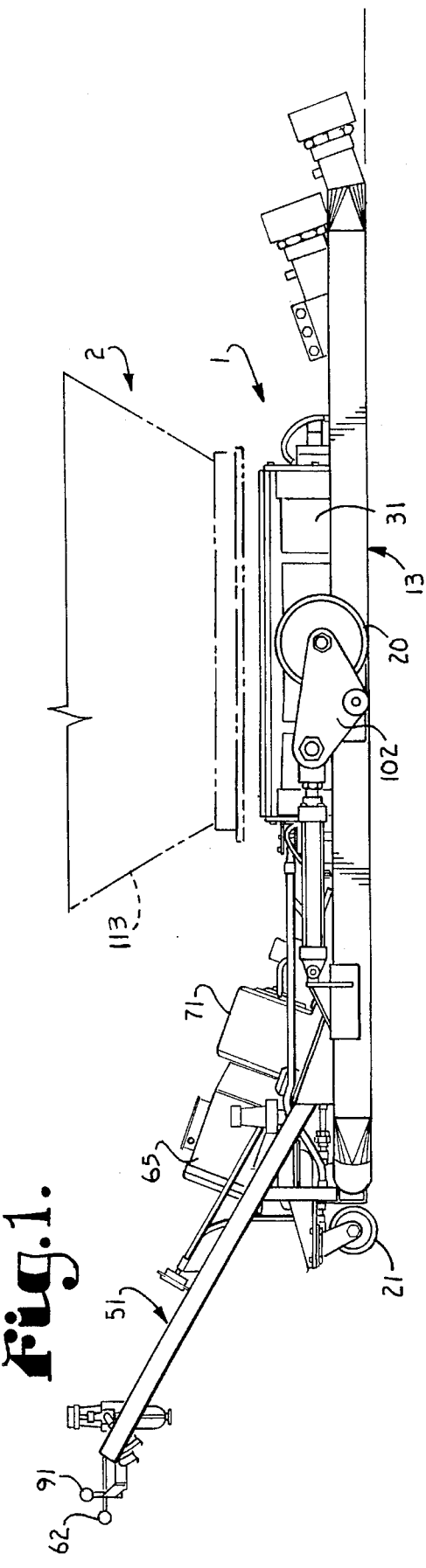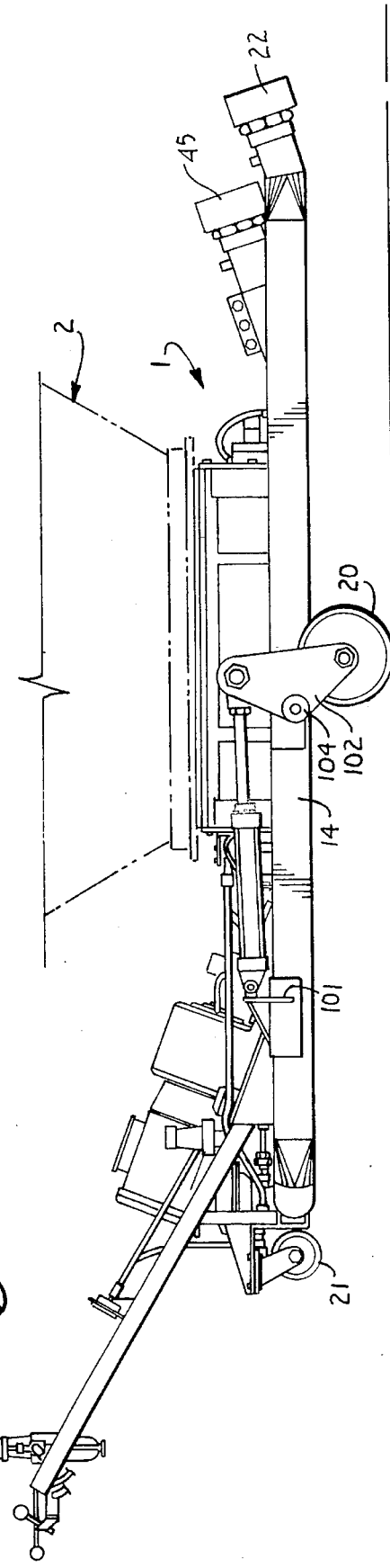

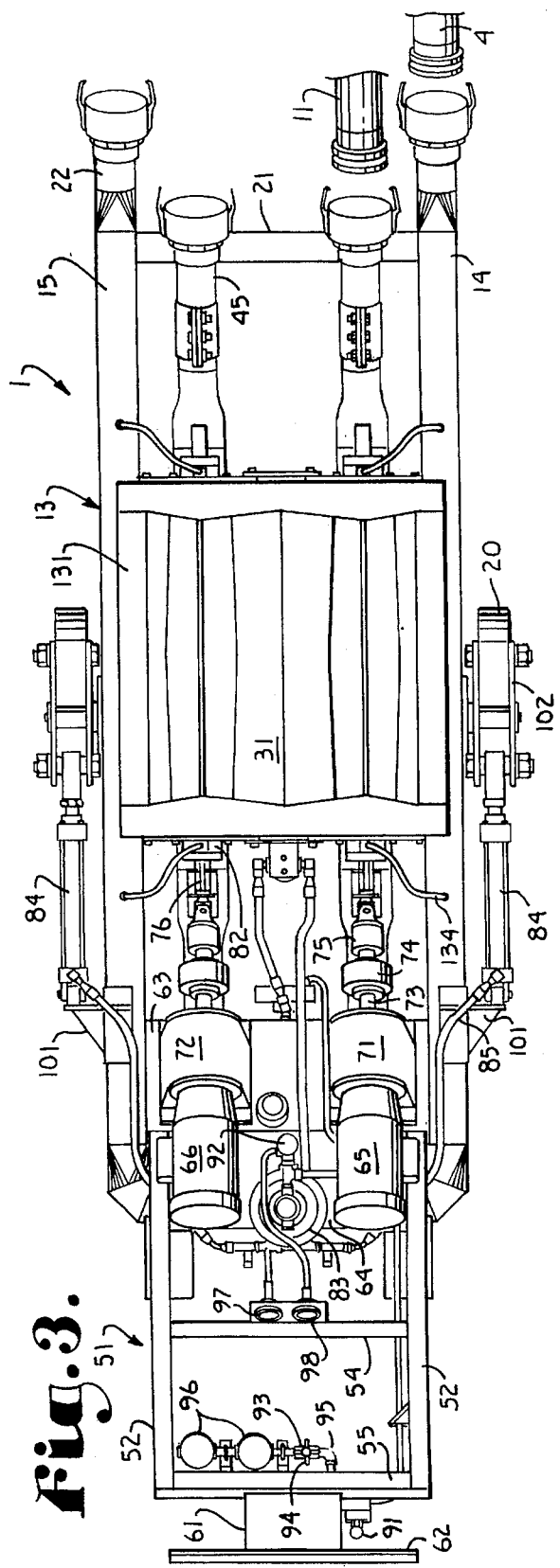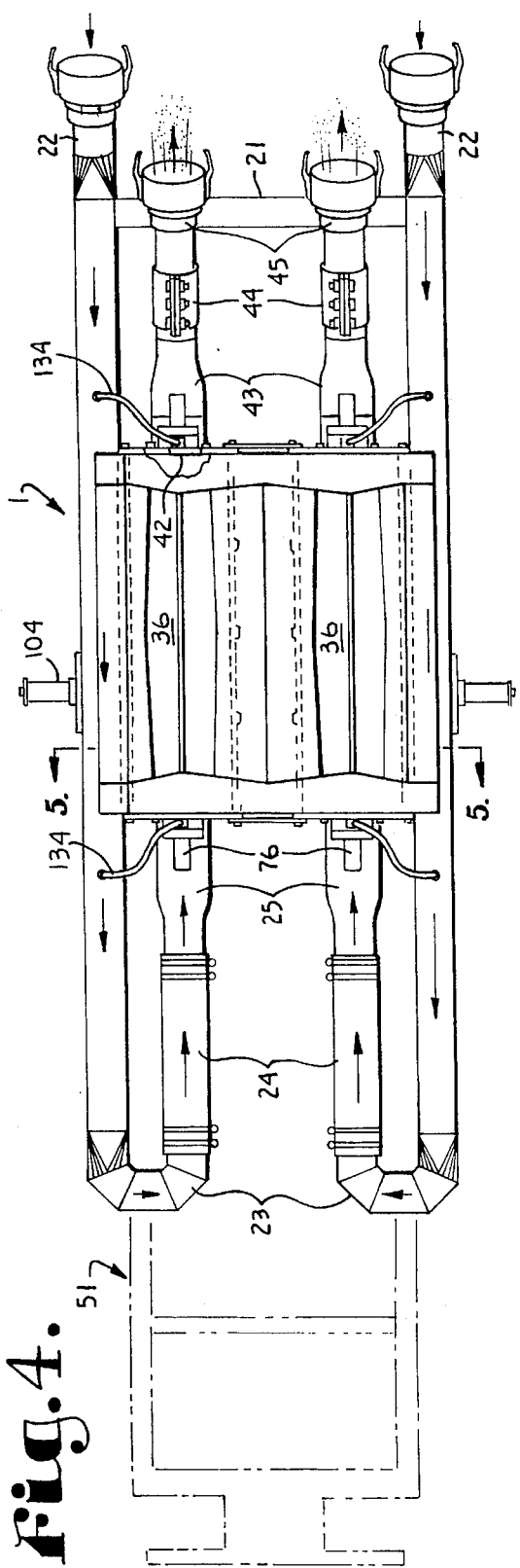

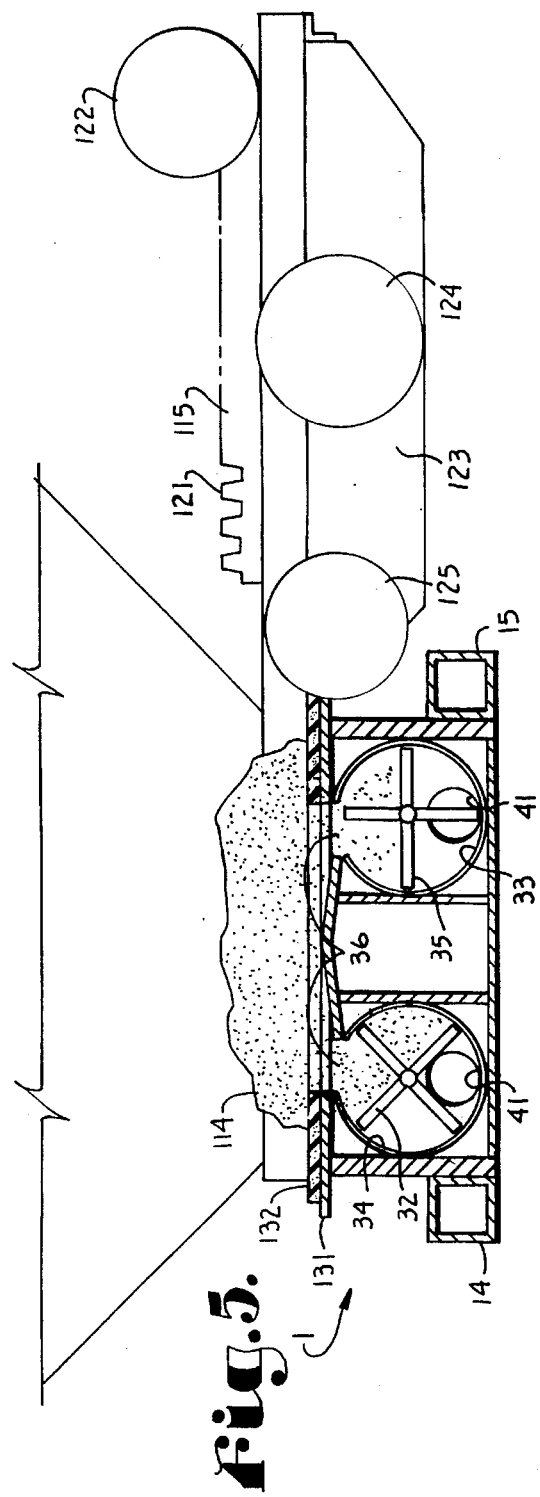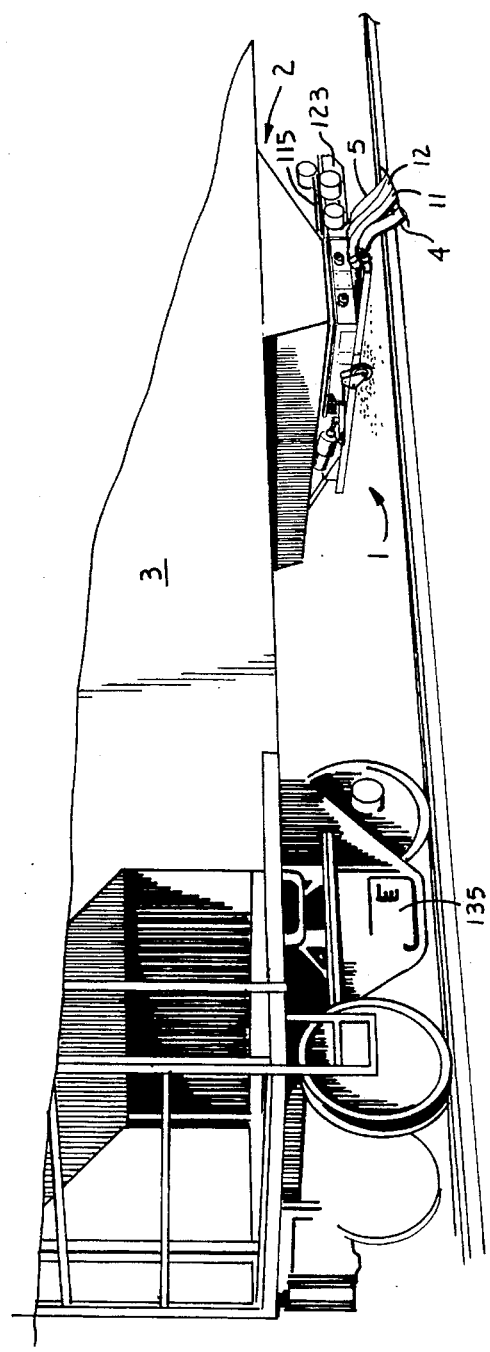

LOW PROFILE PARALLEL RAILCAR DISCHARGE ADAPTOR

CROSS-REFERENCE TO RELATED APPLICATIONS

This application is a continuation-in-part of application Ser. No. 08/040,890 of David K. Smoot, filed Mar. 31, 1993, and now U.S. Pat. No. 5,387,058, and entitled AIRLIFT RAILCAR DISCHARGE ADAPTOR.

FIELD OF THE INVENTION

The present invention relates to a discharge adaptor for connecting a gravity discharge center-flow railcar to a pneumatic conveying system for off-loading bulk granular material therefrom. More particularly, the invention is directed to such a low profile adaptor with a pair of rotary airlocks within a single airlock housing attached to a wheeled frame. The adaptor can be wheeled into position within a confined space between a discharge gate of the center-flow railcar and the top surface of the railroad rails. The wheels are connected to respective hydraulic jacks so that the adaptor can be raised to sealingly engage the airlock housing with the discharge gate, thus positioning the rotary airlocks directly beneath the discharge gate for unloading the granular material from the railcar.

BACKGROUND OF THE INVENTION

The discharge of granular materials from railroad cars has long presented a variety of problems. Traditionally a dedicated railroad siding was needed, often including a sunken pit beneath the railroad track in which was installed a gravity or mechanically operated conveyor. It was often inconvenient or even impossible to locate a plant near enough to such a siding to use the bulk unloading capabilities thereof.

More recently, pressure-type and vacuum-type pneumatic conveyors have been developed in which an adaptor is attached to the discharge gates of the railroad car. One or more pneumatic hoses are attached to the adaptor and the material is gravity-fed into the adaptor and conveyed away in the hoses via an airstream directed therethrough. While such pneumatic conveyors have represented a pronounced improvement over the fixed mechanical or gravity conveyors in sunken pits, a number of problems remain.

Such adaptors tend to be large and bulky, often requiring several workmen to lift and install them onto a railroad car. In addition, these adaptors must be tightly fitted to the car discharge gates and rigidly connected thereto. This is because, as the material is off loaded, the railroad car becomes lighter, thus rising under the influence of the spring suspension. The adaptor must rise with the car while maintaining the seal so that the material can be continuously unloaded without spillage.

There have been numerous prior attempts to produce an improved and more conveniently handled discharge adaptor.

In U.S. Pat. No. 2,813,640 to Loomis, a wheeled discharge adaptor is provided with a hydraulic jacking arrangement such that the adaptor can be wheeled beneath the railroad car and mechanically raised to meet the discharge gate. The hydraulic jacks are equipped with a manually operated jack handle disposed on the opposite side of the railroad car from the maneuvering handle for the adaptor itself. Material from the car discharge gates is gravity fed down an air charged inclined chute to a rotary airlock. The airlock is placed in a pneumatic pressure line for conveying the material from the airlock. The resulting adaptor, with the hydraulic jacks, rotary airlock and air-activated gravity flow chute, necessarily presents a relatively tall profile. Furthermore, in order to operate the jacks, a workman would first need to roll the adaptor under the railroad car and then cross to the other side of the car where he would manually raise the jacks to position the adaptor under the discharge gates. Should the position of the adaptor need to be adjusted during jacking, the workman would need to repeatedly cross from side to side of the car to first adjust the position and then commence jacking again.

In U.S. Pat. No. 5,125,771 to Herman et al., a wheeled adaptor is positionable under a railcar to be unloaded. As in the Loomis patent, a pair of manually operated jacks can then be manipulated to raise the adaptor into position in contact with the railcar discharge gate. The jacks in the Herman patent are mechanically operated screw jacks, including rotary handles which are positioned beneath the railroad car, thus requiring a workman to crawl beneath the car and physically crank the adaptor into position. In addition, the workman must alternate from side to side of the adaptor to incrementally raise the respective jacks to prevent the adaptor from tipping. The adaptor includes a rotary auger-type conveyor which carries material out an elongate tube to a pressure pneumatic or vacuum conveyor, where it is conveyed away. Again, as in the Loomis adaptor, the Herman adaptor requires a workman to wheel it into position and then raise it manually via a set of screw jacks to mate with a discharge gate. Unlike Loomis, with the screw jacks of Herman, no self-correcting leveling is accomplished as the railroad car rises. Thus, a workman needs to constantly adjust the screw jacks as the car rises, again necessitating crawling beneath the car and alternating from side to side of the adaptor.

The transportation and unloading of sugar, flour and other similar bulk dry granular or powder products present a unique set of problems. Traditionally sugar and flour have been hauled with "airslide cars" in which the sides of material storage hoppers slope to a discharge gate at approximately 10–15 degrees. Although these cars basically use a gravity discharge technique, with such a small slope of the hopper sides, air must be injected into the hopper from a separate fan via a manifold in the hopper itself to "fluidize" the material and allow it to flow to the discharge gate. Thus, an unloading station, in addition to the source of conveyor air for the pneumatic conveyor must have a separate fluidization blower, typically a 15 HP unit, to offload the sugar. Furthermore, the hauling capacity of such airslide cars is somewhat limited.

In response, Savannah Foods, a large sugar processing company, in conjunction with the Freight Car division of Trinity Industries, Inc., has developed a specialized center discharge railcar specifically designed for hauling sugar and similar bulk food products. This railcar has a capacity of approximately 260,000 lbs. of sugar, as opposed to approximately 190,000 lbs. for a typical airslide car. The improved center discharge car includes 3 separate hoppers, each of which slopes at approximately 40–45 degrees to a respective gravity-vacuum discharge gate. The increased carrying capacity and the increased hopper discharge slope of the railcar means that, when the railcar is fully loaded with sugar or the like, the clearance between the bottom of each discharge gate and the top surface of the railroad rails is approximately 14 inches. However, the requirement for a separate fluidization blower is eliminated. Each gravity-vacuum discharge gate is equipped with a slide gate and a movable vacuum chamber. With this arrangement, the cargo

3 can be gravity discharged when both the slide gate and the vacuum chamber are opened, or vacuum unloaded via the vacuum chamber when just the slide gate is opened. However, many large volume sugar users, such as cereal and candy makers, have railcar sidings already equipped for unloading airslide railcars via positive pressure pneumatic conveyors and fluidization blowers and thus are not suitably equipped to unload a railcar with a gravity-vacuum discharge gate which requires the attachment of a vacuum pneumatic conveyor. Furthermore, since numerous airslide cars are still in use and will continue to be for some time to come, it is not economically viable to make any changes in unloading equipment which would prevent their use in unloading airslide railcars. Finally, due to the bare 14 inch clearance between the rails and the discharge gate, bulky, high-profile adaptors with air fluidized, shallow incline gravity feed chutes, such as that of Loomis, cannot be used with these railcars.

Accordingly, a need exists for an adaptor which would allow positive pressure pneumatic conveyors, such as those designed for use with airslide railcars, to be used to unload center discharge railcars equipped with gravity-vacuum discharge gates. Such an adaptor must be readily attachable and removable from both the railcar and the pneumatic conveyor, should be readily maneuverable by a single operator, and must present a profile height of less than 14 inches, i.e. the clearance between the rail top surface and the bottom of the gravity-vacuum discharge gate of a loaded railcar. Finally, such an adaptor, even with this low profile, must be equipped with an airlock to allow material to gravity flow from the railcar while preventing air pressure from the pneumatic conveyor from entering the railcar.

SUMMARY OF THE INVENTION

The present invention is directed to a low profile parallel railcar discharge adaptor for connection between a discharge gate of a center discharge railroad hopper car and a pneumatic conveyor for unloading pulverulent and granular material, such as sugar and the like, from the car. The adaptor includes a frame with a low profile airlock housing mounted thereon and a pair of main wheels and a pair of support wheels attached thereto. The airlock housing is split into a pair of parallel cylindrical airlock chambers, and each such chamber has mounted therein a separate rotary airlock vane. Each chamber has an inlet opening at one end thereof and a discharge opening at the opposite end. Also attached to the housing are a pair of pneumatic air inlet lines, each of which is combined with a portion of the frame to form a "J" shaped air passage, with each J shaped passage attached at one end to a respective one of the inlet openings in the chambers and at an opposite end to an air supply source for a pneumatic conveyor. With this arrangement, the frame members perform the dual function of support and air passage, thus helping to minimize the profile height of the adaptor. A pair of pneumatic discharge lines are respectively connected at one end to the pair of discharge openings in the parallel chambers and at the opposite end to a discharge line of a pneumatic conveyor. Each pair of inlet lines and discharge lines thus have their free ends located adjacent each other on the same side of the railcar and can thereby either serve separate conveyors, or the free ends of either or both can be wyed together to serve a single conveyor.

A handle is connected to the adaptor frame, extending therefrom upward at an angle and terminating in a handle grip at a comfortable operating position. A pair of drive motors and a corresponding pair of gear housings are attached to the handle, with each drive motor and gear driving a respective one of the rotary airlock vanes via an angled universal joint.

The main wheels are each connected to a respective hydraulic jack assembly, each of which includes a bell crank, which is, in turn, connected to a respective hydraulic ram cylinder. The pair of hydraulic rams are connected to an air-hydraulic pump on the adaptor frame which pump is selectively supplied with air via a two-way valve. The valve is controllable via a control lever conveniently positioned proximate to the adaptor handle grip to raise and lower the adaptor via the main wheel jack assemblies. The hydraulic pump pressure limits are preset such that, when the adaptor is in a raised position, continuing hydraulic pressure acting on each ram cylinder from the pump urges the adaptor into contact with the railcar discharge gate to keep the adaptor in continuous contact with the discharge gate as the railcar gets lighter and rises due to material being unloaded.

OBJECTS AND ADVANTAGES OF THE INVENTION

The principal objects of the present invention include: to provide an improved low profile parallel railcar discharge adaptor; to provide such an adaptor which includes a frame and a low profile airlock housing with parallel flow-through rotary airlock chambers; to provide such an adaptor wherein each airlock chamber is supplied with air at one end via a respective supply line which incorporates a portion of the frame; to provide such an adaptor in which the opposite end of each airlock chamber is connected to a separate discharge line; to provide such an adaptor with a pair of main wheels attached to respective hydraulic jack assemblies such that the frame can be selectively elevated to place the airlock housing into sealing engagement with a railcar gravity discharge gate; to provide such an adaptor in which a handle extends upward at an angle from the adaptor frame with a pair of airlock drive motors and gear housings attached to the handle; to provide such an adaptor in which a respective pair of angled U-joints connect the drive shaft from each motor to a respective horizontally oriented drive shaft in each airlock to thereby rotatably drive each airlock vane; to provide such an adaptor in which each jack assembly includes a hydraulic ram cylinder selectively connectable to a hydraulic pump via a valve controllable via a single control lever mounted on the adaptor handle; to provide such an adaptor which can be moved, maneuvered, raised and lowered by a workman while standing at a single control position; to provide such an adaptor in which hydraulic pressure supplied to the jack assemblies at preset pump pressure limits will cause the adaptor to rise as the railcar rises during unloading, thus maintaining the airlock housing in sealing engagement with the railcar discharge gate; and to provide such an adaptor which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevational view of an low profile parallel railcar discharge adaptor according to the present invention, with the adaptor illustrated in a lowered position beneath a railcar discharge gate, shown in phantom lines.

FIG. 2 is a side elevational view of the railcar adaptor positioned in sealed engagement with the railcar discharge gate, with the gate again shown in phantom lines, and with the adaptor rising to an upper position as the railcar is unloaded.

FIG. 3 is a top plan view of the railcar adaptor, illustrating the airlock housing with an air to hydraulic pump, parallel airlock chambers, drive motors and gears, and parallel pneumatic supply and discharge lines connected to the airlock housing.

FIG. 4 is a fragmentary, top plan view of the railcar adaptor, with upper portions, including the handle removed but with the handle shown in phantom lines, and with air and material flow through the adaptor indicated with directional arrows.

FIG. 5 is an enlarged, fragmentary cross-sectional view of the adaptor, taken along line 5—5 of FIG. 4, and with a railcar discharge gate illustrated with its vacuum chamber and slide gate opened.

FIG. 6 is a fragmentary, perspective view of a railcar with an inventive railcar adaptor connected thereto.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

I. Low Profile Parallel Railcar Discharge Adaptor

Referring to drawing FIGS. 1–6, the reference numeral 1 generally designates a low profile parallel railcar discharge adaptor in accordance with the present invention. In FIG. 6, the adaptor 1 is shown positioned beneath a hopper discharge gate 2 of a center discharge railcar 3 and connected to a pair of pneumatic conveyor air supply lines 4 and 5 and a corresponding pair of pneumatic conveyor discharge lines 11 and 12 for unloading material from the railcar 3.

The adaptor 1, shown in detail in FIGS. 1–5, includes a frame 13 with a pair of elongate parallel frame members 14 and 15 connected near one end via a cross frame member 16. A pair of main wheels 20 and a pair of support wheels 21 are provided to provide support and mobility of the adaptor 1.

Each of the frame members 14 and 15 is a hollow tube which is rectangular in cross-section, as shown in FIG. 5. Each frame member 14 and 15 is connected at one end to a respective pneumatic air supply adaptor 22 and at the opposite end to a respective U shaped fitting 23. Each U shaped fitting 23 is then connected to an air supply hose 24 which, in turn, is connected to a respective air inlet fitting 25.

A cast airlock housing 31 is rigidly attached to and connected between the frame members 14 and 15. The airlock housing 31 includes a pair of cylindrical airlock chambers 32 and 33 within which are positioned a respective pair of rotary airlock vanes 34 and 35. The airlock housing 31 is cast with a pair of openings 36 in the top thereof, with each such opening 36 leading into a top portion of the cylindrical chambers 32 or 33. Each chamber 32 and 33 includes a through inlet opening 41 at a first end thereof and a through outlet opening 42 at the opposite end such that air can flow from the inlet opening 41 to the outlet opening 42 directly through a bottom portion of each of the chambers 32 and 33.

Referring again to FIG. 4, each air supply fitting 25 is connected to a respective inlet opening 41 of one of the chambers 32 and 33. An air discharge fitting 43 is connected to each respective outlet opening 42, with a clamp 44 connected between each discharge fitting 43 and a respective discharge connector 45.

A handle assembly 51 is connected to and between the frame members 32 and 33 and extends upward at an angle therefrom. The handle assembly 51 includes a pair of angled support members 52 to which are attached respective angle members 53. A pair of cross supports 54 and 55 extend between the members 53, a grip support plate 61 extends outward from the cross support 55 and a handle grip 62 is attached to the support plate 61. Also attached to and extending between the angle members 53 are a motor and gear housing support plate 63. Extending between the adaptor frame members 32 and 33 is a hydraulic pump support plate 64.

A pair of electric airlock drive motors 65 and 66 and a respective pair of connected gear housings 71 and 72 are attached to the motor support plate 63. The gear housings 71 and 72 each include a drive reduction gear (not shown), which is attached to a respective drive shaft 73. A respective bearing 74 is attached to each drive shaft 73 and a respective angled universal joint 75 is attached to each bearing 74. Each universal joint 75 is connected to a respective rotary airlock drive shaft 76 which is connected through a wall 81 of the airlock housing 31 via a respective seal 82 to drive the rotary vane 34 or 35.

An air over hydraulic pump 83 is attached to the pump support plate 64. The pump 83 utilizes pneumatic air pressure to generate hydraulic pressure to operate a pair of hydraulic rams 84. Hydraulic lines 85 lead from the pump 83 to each of the rams 84. A three position lift control lever 91 controls the supply of air pressure to the pump 83 via a valve 92, and, thereby, the supply of hydraulic pressure to both rams 84. The three positions are raise, in which air pressure is supplied to the pump 83, lower, in which air pressure is withdrawn from the pump 83 and a valve 93 is opened to allow hydraulic pressure to bleed from the rams 84, and thus raise the main wheels 20 to lower the adaptor 1, and an intermediate "stay" position which maintains the adaptor at a set height by closing both the valves 92 and 93. The lift control lever 91 is positioned proximate the handle grip 62, as is the valve 93 which is adjustable via an adjustment knob 94. The valve 93 is positioned in a hydraulic line 95 leading between the rams 84 and a hydraulic reservoir 96 and the adjustment knob 94 controls the rate at which hydraulic pressure is released from the rams 84, and thus the rate at which the adaptor 1 is lowered from a raised position. A pair of gauges 97 and 98 indicate hydraulic and pneumatic pressure, respectively, at the pump 83.

Each hydraulic ram 84 is pivotally connected between a support arm 101 attached to a respective one of the frame members 14 or 15 and one end of a respective bell crank 102. Each bell crank 102 is attached at an opposite end to a respective one of the main wheels 20 and at an intermediate pivot point 104 to the frame members 14 or 15. As the rams 84 are extended via hydraulic pressure from the pump 83, the bell cranks 102 are pivoted relative to the frame members 14 and 15, thus selectively raising the adaptor 1 between the lowered position illustrated in FIG. 1 and the raised position illustrated in FIG. 2. Alternatively, as hydraulic pressure is released from the rams 84, the adaptor 1 is selectively lowered between the position of FIG. 2 and that of FIG. 1.

II. Operation

Referring to FIGS. 5 and 6, the adaptor 1 is designed to unload granular material 111, such as sugar or flour, for example, from a center discharge railcar, such as the railcar 3. The railcar 3 is typically equipped with a plurality of gravity-vacuum discharge gates, such as the gate 2 illustrated schematically in FIG. 5. Each gate 2 includes a tapered inlet 113 with an opening 114. A slide gate 115 is selectively movable via a rack and pinion gear 121 driven by motor 122 between the open position shown in FIG. 5 and a closed position in which the opening 114 is covered by the plate 115. Positioned beneath the slide gate 115 is a vacuum chamber 123 to which is attached a vacuum hose fitting 124. The vacuum chamber 123 is also movable between open and closed positions via a similar rack and pinion (not shown) driven by a motor 125. Thus, the gate 2 has four possible conditions. First, both the slide gate 115 and the vacuum chamber 123 can be closed, a condition typically used during transport. Second, the slide gate 115 can be opened and the vacuum chamber 123 closed, a position used for vacuum unloading of the railcar 3 when a vacuum hose is connected to the fitting 124. Third, the vacuum chamber 123 can be opened and the slide gate 115 closed, a ready position for gravity discharge operations and fourth, both the slide gate 115 and the vacuum chamber 123 can be opened to allow the material 111 to gravity feed out of the railcar 3 via the opening 114.

The inventive adaptor 1 is designed for use with the gate 2 in the gravity flow condition, i.e. the vacuum chamber 123 opened. When a loaded railcar 3 is to be unloaded via a positive pressure pneumatic conveyor, the adaptor 1 is rolled beneath the railcar 3 to the position shown in FIGS. 1 and 6. In this position, a peripheral lip 131 of the airlock housing 31 and the periphery of the gate 2 are aligned. The gate 2 is provided with a resilient perimeter seal 132 attached on three sides of the opening 114 and a removable resilient sealing strip 133 must be manually inserted on the side of the opened vacuum chamber 123. Once the removable sealing strip 133 is placed in position, the adaptor is raised via the rams 84 and the control lever 91 until the peripheral lip 131 of the airlock housing 31 is pushed against the seals 132 and 133, thus providing an air tight seal between the gate 2 and the airlock housing 31.

The conveyor inlet and outlet hoses 4, 5 and 11, 12, respectively are then connected to the adaptor fittings 22 and 45, and the motors 64 and 65 are started, thus spinning the airlock vanes 34 and 35. At this point, the slide gate 115 is withdrawn from the gate opening 114 and material 111 begins to fall directly from the railcar 3 into the airlock housing 31. The spinning vanes 34 and 35 push the material 111 about the periphery of each cylindrical chamber 32 and 33 from the top to the bottom thereof until the material 111 reaches the bottom portion of the chambers 32 and 33. Thus, the airlock housing 31, with the spinning vanes 34 and 35, machined so that their spinning ends reach extremely close to the walls of the chambers 32 and 33, e.g. within 0.005 inch, serves as a metering device to allow material 111 to drop from the railcar 3 at atmospheric pressure, but to enter the pressurized conveyor lines 11 and 12 from the bottom of each chamber 32 and 33. Material 111 reaching the bottom portion of the chambers 32 and 33 is thus blown out through the discharge openings 42 in the chambers 32 and 33, and into the discharge lines 11 and 12, respectively of the pneumatic conveyors. Air flow through the adaptor 1, and flow of the material 111 out of the chambers 32 and 33 is indicated by the arrows in FIG. 4.

In a known fashion, positive air pressure drawn from the frame members 14 and 15 is directed into the airlock seals 82 via a respective plurality of air lines 134. This sets up a pressure differential within each airlock chamber 32 and 33 so that material 111 does not enter and clog the seals 82 and drive shafts 76.

As material 111 is unloaded from the railcar 3, the railcar 3 will gradually rise due to the action of suspension springs 135. The rising railcar 3 causes pressure to be released from the wheels 20, and thus the hydraulic rams 84. The hydraulic pump 83 is preset to pressure limits such that it will counteract the relief of pressure on the rams 84 by pumping more hydraulic fluid, thus causing the adaptor 1 to automatically rise with the railcar 3. Thus, the seal between the gate 2 and the airlock housing 31 is constantly maintained as material 111 is unloaded. Once the connected hoppers are unloaded from a first gate 2 of the railcar 3, the adaptor 1 and connected conveyor lines 4, 11 and 5, 12 are moved to the next gate and the process is repeated.

In one embodiment of the adaptor 1, the airlock rotors 34 and 35 were 36" long with a 10" diameter. The airlock housing 31 was made of grey iron and the rotors 34 and 35 themselves were made of 304 Stainless Steel. The motors 65 and 66 were variable speed AC electric motors and AC inverters were used with the motors 64 and 65 to vary material feed rates.

While the discharge adaptor 1 has been shown and described for use with a railcar 3, it should be apparent that any gravity discharge receptacle containing pulverulent or granular material can be unloaded in a similar fashion.

It is to be understood that while certain forms of the present invention have been illustrated and described herein, it is not to be limited to the specific forms or arrangement of parts described and shown.

What is claimed and desired to be secured by Letters Patent is as follows:

1. A discharge adaptor for connection between a discharge gate of a railcar and a pressure pneumatic conveyor for unloading material from said railcar, comprising:

a. a frame with a low profile airlock housing attached thereto, said airlock housing including a top surface which is sealingly engagable with said discharge gate;

b. a pair of juxtaposed parallel cylindrical airlock chambers within said airlock housing;

c. a pair of airlock vanes, one positioned within each said chamber, said chambers and vanes forming a pair of side by side parallel rotary airlocks, each of which has an top opening with both top openings positioned side by side beneath said discharge gate when said airlock housing is sealingly engaged therewith; and d. elevation means for selectively raising and lowering said frame and said airlock housing.

2. A discharge adaptor as in claim 1, wherein said elevation means includes:

a. a pair of main wheels attached to said frame; and b. a pair of hydraulic jack assemblies, each jack assembly being attached to a corresponding one of said main wheels such that said wheels can be selectively raised and lowered relative to said frame.

3. A discharge adaptor as in claim 2, and further comprising:

a. a handle assembly attached to and extending upward at an angle from said frame, said handle assembly terminating in a handle grip; and b. control means located on said handle assembly proximate said handle grip for selectively controlling said hydraulic jack assemblies.

4. A discharge adaptor as in claim 2, said elevation means further comprising:

a. an air to hydraulic pump and an adjustable valve connected thereto, said pump and said valve providing hydraulic pressure to said jack assemblies sufficient to maintain the seal between said housing and said discharge gate as the railcar rises during unloading.

5. A discharge adaptor as in claim 1 and further comprising a handle assembly including a pair of handle support members, each of which is attached to and extends upward at an angle from said frame, said adaptor further comprising:

a. a pair of airlock drive motors attached to said handle support members such that said motors are also oriented at an upward angle relative to said frame, each motor including a respective motor drive shaft which extends toward said frame;

b. a pair of airlock drive shafts extending substantially horizontally through respective ones of said airlock chambers and connected to corresponding ones of said airlock vanes such that each said vane is rotated with the corresponding drive shaft; and c. a pair of universal joints attached between respective ones of said motor drive shafts and said airlock drive shafts whereby said drive motors are connected to drive said airlock vanes.

6. A discharge adaptor as in claim 1, and further comprising:

a. a pair of inlet openings in one end of said airlock housing, each said inlet opening extending into a bottom portion of a corresponding one of said airlock chambers;

b. a pair of outlet openings in an opposite end of said airlock housing, each said outlet opening extending into a bottom portion of a corresponding one of said airlock chambers;

c. a pair of pneumatic air inlet lines connected to corresponding ones of said inlet openings; and d. a pair of discharge outlets connected to corresponding ones of said outlet openings.

7. A discharge adaptor as in claim 6, wherein said frame includes a pair of hollow frame members extending longitudinally along said adaptor, said airlock housing being connected to and extending between said frame members, each of said air inlet lines being substantially J shaped and including, as a portion thereof, respective ones of said hollow frame members.

8. A discharge adaptor for connection between a discharge gate of a railcar and a pressure pneumatic conveyor for unloading material from said railcar, comprising:

a. a frame with a pair of hollow frame members extending longitudinally along said adaptor;

b. a low profile airlock housing attached thereto and extending between said frame members, said airlock housing including a top surface which is sealingly engageable with said discharge gate;

c. a pair of juxtaposed parallel cylindrical airlock chambers within said airlock housing;

d. a pair of rotary airlock vanes, one of said vanes being positioned within each said chamber, said chambers and vanes forming a pair of side by side parallel rotary airlocks, each of which includes a top opening with both of said top openings positioned side by side beneath said discharge gate when said airlock housing is sealingly engaged therewith;

e. elevation means for selectively raising and lowering said adaptor;

f. a pair of inlet openings in one end of said airlock housing, each said inlet opening extending into a bottom portion of a respective one of said airlock chambers;

g. a pair of outlet openings in an opposite end of said airlock housing, each said outlet opening extending into a bottom portion of a respective one of said airlock chambers;

h. a pair of air inlet lines connected to corresponding ones of said inlet openings, each said air inlet line being substantially J shaped and including, as a portion thereof, a respective one of said hollow frame members; and i. a pair of discharge outlets respectively connected to said outlet openings.

9. A discharge adaptor for connection between a discharge gate of a railcar and a pressure pneumatic conveyor for unloading material from said railcar, comprising:

a. a frame with a low profile airlock housing attached thereto, said airlock housing including a top surface which is sealingly engagable with said discharge gate;

b. a pair of juxtaposed parallel cylindrical airlock chambers within said airlock housing;

c. a pair of airlock vanes, one of said vanes being positioned within each said chamber, said chambers and vanes forming a pair of side by side parallel rotary airlocks, each of which includes a top opening with both of said top openings positioned side by side beneath said discharge gate when said airlock housing is sealingly engaged therewith; and d. a pair of main wheels attached to said frame.

10. A discharge adaptor as in claim 9, and further comprising:

a. a pair of hydraulic jack assemblies, each of said jack assemblies being attached to a corresponding one of said main wheels such that said wheels can be selectively raised and lowered relative to said frame.

11. A discharge adaptor as in claim 10, and further comprising:

a. a handle assembly attached to and extending upward at an angle from said frame, said handle assembly terminating in a handle grip; and b. control means located on said handle assembly proximate said handle grip for selectively controlling said hydraulic jack assemblies.

12. A discharge adaptor as in claim 11, and further comprising:

a. an air to hydraulic pump and an adjustable valve connected thereto, said pump and said valve providing hydraulic pressure to said jack assemblies sufficient to maintain the seal between said housing and said discharge gate as the railcar rises during unloading.

13. A discharge adaptor as in claim 9, and further comprising a handle assembly including a pair of handle support members, each of which is attached to and extends upward at an angle from said frame, said adaptor further comprising:

a. a pair of airlock drive motors attached to said handle support members such that said motors are also oriented at an upward angle relative to said frame, each motor including a respective motor drive shaft which extends toward said frame;

b. a pair of airlock drive shafts extending substantially horizontally through respective ones of said airlock chambers and connected to corresponding ones of said airlock vanes such that each said vane is rotated with the corresponding drive shaft; and c. a pair of universal joints attached between respective ones of said motor drive shafts and said airlock drive shafts whereby said drive motors are connected to drive said airlock vanes.

14. A discharge adaptor as in claim 9, and further comprising:

a. a pair of inlet openings in one end of said airlock housing, each said inlet opening extending into a bottom portion of a corresponding one of said airlock chambers;

b. a pair of outlet openings in an opposite end of said airlock housing, each said outlet opening extending into a bottom portion of a corresponding one of said airlock chambers;

c. a pair of pneumatic air inlet lines connected to corresponding ones of said inlet openings; and d. a pair of discharge outlets connected to corresponding ones of said outlet openings.

15. A discharge adaptor as in claim 14, wherein said frame includes a pair of hollow frame members extending longitudinally along said adaptor, said airlock housing being connected to and extending between said frame members, each of said air inlet lines being substantially J shaped and including, as a portion thereof, respective ones of said hollow frame members.

16. A discharge adaptor for connection between a discharge gate of a railcar and a pressure pneumatic conveyor for unloading material from said railcar, comprising:

a. a frame with a low profile airlock housing attached thereto, said airlock housing including a top surface which is sealingly engagable with said discharge gate;

b. a pair of juxtaposed parallel cylindrical airlock chambers within said airlock housing;

c. a pair of airlock vanes, one of said vanes being positioned within each said chamber, said chambers and vanes forming a pair of parallel rotary airlocks, each of which has an opening which is positioned directly beneath said discharge gate when said airlock housing is sealingly engaged therewith;

d. elevation means for selectively raising and lowering said adaptor;

e. a handle assembly attached to and extending upward at an angle from said frame, said handle assembly terminating in a handle grip, said handle assembly including a pair of handle support members, each of which is attached to and extends upward at said angle from said frame;

f. a pair of airlock drive motors attached to said handle support members such that said motors are also oriented at an upward angle relative to said frame, each motor including a respective motor drive shaft which extends toward said frame;

g. a pair of airlock drive shafts extending substantially horizontally through respective ones of said airlock chambers and connected to corresponding ones of said airlock vanes such that each said vane is rotated with the corresponding drive shaft; and h. a pair of universal joints attached between respective ones of said motor drive shafts and said airlock drive shafts whereby said drive motors are connected to drive said airlock vanes.

17. A discharge adaptor as in claim 16, and further comprising:

a. control means located on said handle assembly proximate said handle grip for selectively controlling said elevation means;

b. an air to hydraulic pump which is adjustable to provide hydraulic pressure to said elevation means.

* * * * *